United States Patent [19]
Schlattmann et al.

[11] Patent Number: 6,116,572
[45] Date of Patent: Sep. 12, 2000

[54] VALVE

[76] Inventors: Josef Schlattmann, Resseltstrasse 26, 48431 Rheine; Franz-Josef Riesselmann, Lerchenstrasse 6, 49393 Lohne; Joerg Claussen, Schulte-Herman-Strasse 3, 48161 Muenster; Christian Terhaar, Brookstegge 1, 48683 Ahaus, all of Germany

[21] Appl. No.: 09/254,679

[22] PCT Filed: Sep. 16, 1997

[86] PCT No.: PCT/EP97/05050

§ 371 Date: May 14, 1999

§ 102(e) Date: May 14, 1999

[87] PCT Pub. No.: WO98/11369

PCT Pub. Date: Mar. 19, 1998

[30] Foreign Application Priority Data

Sep. 16, 1996 [DE] Germany .......................... 196 37 663

[51] Int. Cl.⁷ ................................................. F16K 25/00
[52] U.S. Cl. .......................... 251/193; 251/327; 251/328; 251/333; 251/266
[58] Field of Search .................... 251/193, 195, 251/327, 328, 329, 326

[56] References Cited

U.S. PATENT DOCUMENTS

| | | | |
|---|---|---|---|
| 762,436 | 9/1904 | Osgood | 251/195 |
| 2,269,404 | 1/1942 | Haven et al. | 251/155 |
| 4,765,586 | 8/1988 | Yoshida | |
| 5,143,350 | 9/1992 | Osgood | 251/195 |

FOREIGN PATENT DOCUMENTS

| | | |
|---|---|---|
| 0473119A1 | 3/1992 | European Pat. Off. |
| 0646740A1 | 4/1995 | European Pat. Off. |
| 1922516 | 5/1969 | Germany ............................. 251/326 |
| 2085128 | 4/1982 | United Kingdom. |

*Primary Examiner*—Kevin Shaver
*Assistant Examiner*—John P. Welsh
*Attorney, Agent, or Firm*—Birch, Stewart, Kolasch & Birch, LLP

[57] ABSTRACT

A valve comprises a valve housing (2) with a valve inlet (11), a valve outlet (12) and a passage (66) extending through the valve housing (2) from the valve inlet (11) to the valve outlet (12). A valve seat (5) is provided in the passage which comprises a valve sealing surface (50). Further, the valve comprises a blocking element (3) adapted to be moved at least partly into the valve seat (5) for blocking the passage by abutment on the valve sealing surface (50), the blocking element being moved along a direction (102) extending under an acute angle to the plane (90) in which the valve seat (5) is arranged. The valve sealing surface (50) of the valve seat (5) is spherical in shape.

14 Claims, 10 Drawing Sheets

VALVE

This application is the national phase under 35 U.S.C. §371 of PCT International Application No. PCT/EP97/05050 which has an International filing date of Sep. 16, 1997 which designated the United States of America.

BACKGROUND OF THE INVENTION

The invention refers to a slanted seat valve with a valve inlet, a valve outlet and a passage extending through the valve housing between the valve inlet and the valve outlet.

Valves are often used to block pipe lines against media flowing therein, which valves are, in particular, stroke valves with a conical seat surface and a blocking element fixed at a spindle and displaced vertically to the flow direction when the valve is closed. Such valves are disadvantageous because of their high drag and the resulting great flow losses occurring in the closing area due to the deflection of the flow.

Slanted seat valves represent a development of these straight seat valves; here, the valve seat is a slanted portion of a circular cone, the symmetrical axis of which extends in parallel to the spindle axis. A slanted arrangement of the valve seat and the blocking element may well effect a reduction of the drag, but in case of a spindle arranged obliquely with respect to the pipe axis, this valve is disadvantageous because of a larger stroke and an impaired operability resulting therefrom. With slanted seat valves having the spindle axis and the pipe axis arranged at right angles, larger pressure differences between the blocking element sides, due to the imbalanced distribution of surface pressure, will cause leaks at the valve seat, since the required surface pressure doses not prevail everywhere. With such slanted seat valves, an eccentric arrangement of the blocking element at the spindle requires an additional fixing against rotation using fixing elements such as pins.

From DE-A-43 42 025 und DE-A-36 09 772, slanted seat valves optimized with respect to the sealing problems are known. The balancing of the surface pressure caused by the force of the spindle over the valve seat surface is achieved by disposing the spindle axis connected with the blocking member eccentrically relative to the center of the plane formed by the valve seat surface and projected in the direction of the spindle axis. The spindle axis is shifted towards a (top) portion of the blocking element proximal to the spindle, the point of attack of the spindle force being arranged such that its effective direction intersects the perpendicular lines to the valve seat surfaces in the intersection of the center plane of the blocking element and the valve seat surface and the pressure component vertically attacking the blocking element within a triangle formed by these intersecting straight lines.

A study of the force relations at the blocking element reveals that there is a limit pressure difference $\Delta p_G$ in this embodiment as well, at which the limit pressure force $F_{pG}$ is canceled at one point of the sealing surface so that leaks can occur. Increasing the spindle force may result in a limited improvement; however, the increase of the spindle force is limited by the strength of the spindle and the valve housing.

Further possibilities to increase the limit pressure force $F_{pG}$ are known, using, on the one hand, valves having a very steeply inclined, almost vertical valve seat or, on the other hand, valves having a conical valve seat, the cone axis being inclined towards the spindle axis. A steeply inclined seat surface is disadvantageous in that, upon opening the valve, the valve plate may jam due to some self-locking effect and cannot be opened without damage. In the slanted embodiment of the conical seat only very shallow elliptic flow cross sections are achieved so that the drag is rather great in these valves.

From DE-A-24 30 537, a slanted seat valve with a wedge-shaped blocking element is known that is movable transversely into the passage of a valve housing. The oblique face of the blocking element seals against a valve seat formed in the passage and having a continuous bead shaped valve sealing surface. The valve housing comprises guides for the wedge shaped blocking element, thereby preventing that the blocking element cannot be deflected in the direction of the length of the passage when being pressed against the valve sealing surface. This adds to the machining effort for the valve housing and increases the costs for the valve.

SUMMARY OF THE INVENTION

It is an object of the invention to provide a valve, in particular a slanted seat valve that reliably seals the passage of the valve housing while being of a most simple structure.

The object is solved according to the invention by providing a valve comprising
- a valve housing with a valve inlet, a valve outlet and a passage extending through the valve housing from the valve inlet to the valve outlet,
- a valve seat provided in the passage and comprising a valve sealing surface, and
- a blocking element adapted to be moved at least partly into the valve seat for blocking the passage by abutment on the valve sealing surface, the blocking element being moved along a direction extending under an acute angle to the plane in which the valve seat is arranged.

This valve is characterized according to the invention in that the valve sealing surface of the valve seat being spherical in shape.

This spherical shape of the valve sealing surface of the valve seat causes a linear contact between the blocking element and the valve seat. The fact that the blocking element may be moved at least partly into the valve seat for blocking the passage by linear abutment on the bulbous, spherical or convex valve sealing surface, thus at least partly penetrating the valve seat in the blocking state, the valve seat is undercut und thereby sealed reliably since the prevailing pressure is converted into a pressure force pushing the blocking element further into the valve seat.

According to an advantageous development of the invention it is provided that the valve sealing surface of the valve seat lies on a (imaginary) annular member and forms a part of the surface thereof. This annular member comprises a central plane on which the central axis of the annular member stands. Since the valve sealing surface is formed by surface portions of the annular member located above and below this central plane, the plane of the valve seat and the central plane extend under an acute angle of inclination, in particular an angle between 10° and 30°, and preferably about 20°.

In other words, the annular member comprises a bottom face directed towards the valve inlet and a top face directed towards the valve outlet. Here, the valve sealing surface is formed by parts of the surface of the imaginary annular member located in part on the top face and the bottom face, respectively, and, again in part, on the level of the central plane on the inner surface of the annular member between the top and the bottom faces thereof.

Preferably, the annular member is a circular or oval annular member, in particular having a circular or otherwise round cross section. The area enclosed by the annular member, seen in projection of the direction of movement of the blocking element, is equal to the cross-sectional area of the blocking element. At the level of these two areas, the exterior of the blocking element and the inner surface of the annular member are in contact along a sealing line. Such linear pressure is easier to realize with high pressure forces than surface pressure, which is why the present valve has reliable sealing properties while being of most simple structure.

In an advantageous embodiment of the present invention, the direction of movement of the blocking element extends substantially rectangular to the extension of the passage. In addition, it may suitably provided that the plane in which the annular member is located extends under an acute angle of inclination of the annular member to the extension of the passage. This angle of inclination is preferably between 30° and 60°, in particular between 40° and 50°, and preferably substantially about 45°.

Preferably, the blocking element is a pointed, blunt or beveled cone, whereas the imaginary annular member is an oval ring with a circular cross section inclined such with respect to the direction of movement of the blocking element that it encloses a circular area, seen in the direction of movement of the blocking element.

According to an advantageous embodiment of the invention, it is provided that the valve seat is an integral part of the valve housing and is made when forming the valve housing. As an alternative, it may be provided that the valve seat is a separate member inserted into the valve housing.

Further, it is provided according to an advantageous embodiment of the invention that the valve housing is in the shape of a T-pipe with a substantially straight passage pipe portion and a branch pipe portion substantially rectangular to the same. The blocking element is situated in the branch pipe portion and is moved into the passage pipe portion from the side. The inner surface of the passage pipe portion is formed with an inward protruding continuous annular surface extending into the passage pipe portion as a projecting bead. This annular projecting bead is situated under an angle of 45° to the longitudinal axis of the passage pipe portion and, thus, also forms an angle of 45° with the longitudinal axis of the branch pipe portion. The center of the area enclosed by the annular projecting bead coincides with the intersection of the longitudinal axes of the passage and branch pipe portions. This means that the annular projecting bead extends in the corner portion between the passage pipe portion and the branch pipe portion.

A valve housing formed according to the above described specification is advantageous in that straight-way valves and corner valves may be produced using the same valve housing. With a straight-way valve, the blocking element and the moving element moving the same are situated in the branch pipe portion so as to be moved into the passage pipe portion. Using the valve housing for a corner valve, the blocking element is situated in one portion of the passage pipe portion and may be moved into the other portion of the passage pipe portion to block the angled passage between this portion of the passage pipe portion and the branch pipe portion. Whereas, in the straight-way valve, the inlets and outlets of the valve housing are formed by the axial end of the passage pipe portions, the inlets and outlets of the valve housing of a corner valve are formed by one of the two axial ends of the passage pipe portion and by the axial end of the branch pipe portion.

The annular bead-like projection on the inner surface of the passage pipe portion is preferably formed by a local beading deformation in the wall of the T-pipe. With such a valve housing, the exterior thus has a continuous depression inclined under an angle of 45° to the longitudinal axis of the passage pipe portion and the longitudinal axis of the branch pipe portion. The valve housing is advantageously made from plastics material. Injection molding or high pressure forming are suitable manufacturing methods, where, in the latter, a blank is given the desired shape by creating high internal and/or external pressures. Both methods are advantageous in that the inner side of the passage pipe portion, and thus the valve seat and its valve sealing surface, need not be machined afterwards but may be manufactured directly together with the valve housing.

The present invention comprises a valve housing with a valve seat having a three-dimensional convexly curved seat surface as the valve seat surface. In the closed position of the valve, a blocking element engages the valve seat positively and non-positively, the blocking element being provided in particular at the end of a spindle or another moving element.

The valve sealing surface lies on a surface section of an imaginary annular member annularly extending around the valve seat, the annular member being created by rotating a (cross-sectional) area on a circular or elliptic path lying in a plane of rotation about a central axis situated in the sectional area of flow of the valve seat or by rotation about this central axis. The cross-sectional area is convex at the edge facing the central axis so that the tangent lines to annular member circumference points proximal to the central axis extend almost parallel to the central axis and the tangent line to lower or upper annular member circumference points more distant from the plane of rotation are almost parallel to the plane of rotation. Feasiblely, the cross-sectional areas of the annular member are circular or elliptic areas or areas partly defined by parabolic or hyperbolic lines. Similarly, areas formed by a polygon, whose circumferential portion distant from the plane of rotation is formed by a straight line slightly inclined with respect to the plane of rotation, the circumferential portion close to the central axis being formed by a section of a circle and the circumferential portion close to the plane of rotation being formed by a straight line steeply inclined with respect to the plane of rotation.

In a particularly preferred embodiment, the imaginary annular member has a toroidal surface, the annular member being inclined under an acute angle $\alpha$ (angle of inclination of the annular member) with respect to the main flow direction, or the pipe axis, extending between the valve inlet and the valve outlet. Suitably, the blocking member is frustoconical, presenting linear contact with the valve sealing surface (torus) of the valve seat when in the closed position. Compared to surface contact, a linear contact has a much higher surface pressure and the seat surface is less sensitive to impurities due to the small contact area.

The sealing line corresponds to a generating line around the torus, on which line a first (upper) generating line point close to the spindle and a second (lower) generating line point distant from the spindle are provided. In vertical section, the annular member has a first (upper) cross-sectional area and a second (lower) cross-sectional area. The first generating line point lies on a portion of a first circumference of the upper cross-sectional area, the portion extending between a first intersection and a first tangential point, the first intersection being a spindle-side (upper) intersection of a first diameter of the upper cross-sectional area, extending in the effective direction of a pressure force attacking at the inflow-side of the blocking element, with the first circumference, and the first tangential point being a first contact point of a tangent to the inner convex surface, the tangent line extending in parallel with the spindle axis. The second generating line point lies on a portion of a second circumference of the lower cross-sectional area, the portion connecting a second intersection and a second tangential point, the second intersection being an intersection, inside the convex surface, of a second diameter of the lower cross-sectional area lying in the plane of rotation with the second circumference, and the second tangential point being a second contact point of a tangent line to the inner convex surface extending in parallel with the spindle axis.

With such an arrangement of the valve seat and the valve plate, the blocking element, when in the closed position of the valve, undercuts the valve seat in the lower portion of the valve seat in the direction of the pressure force $F_p$ caused by the pressure difference so that the fitting is self-sealing in this portion. The pressure force $F_p$ does not urge the top portion of the blocking element away from the valve seat, since the entire blocking element is supported in the lower portion of the valve at the spindle guide perpendicular to the spindle axis. Thus, the blocking element is stable without any active force in the axial direction of the spindle. An active spindle force $F_s$ would be distributed over the entire sealing surface without an additional pressure force taking influence on the resulting surface pressure between valve seat and blocking element.

A study of the forces attacking at the blocking element reveals that, ideally, the sealing line extends between the first (upper) tangential point and the second (lower) tangent line point of the two cross-sectional areas.

A disc-like valve plate with a concave plate edge surface as the valve plate sealing face, which, in the closed position, abuts the valve seat positively and non-positively and whose in-flow valve plate front side is arranged under an acute angle β (inclination angle of the plate) to the plane of rotation of the imaginary annular member, is also suited as the blocking element. The contour of the valve plate is designed such that, in the closed position of the valve, the valve plate front side is defined by a sealing edge (sealing line) terminating the sealing surface.

Together with the frictional forces acting on the sealing surface, a shifting of the spindle axis towards the upper generating line point has a positive effect on the compensation of the moments generated in the upper portion of the sealing surface.

The present shapes of the blocking element allow for a smooth insertion of the blocking element into the valve seat form the side of the moving element, in particular from the spindle side, the blocking element sealing tightly at any point of the valve seat, when closed. The inclination of the imaginary annular member causes the drag in the valve to decrease, since circular or elliptic sectional areas of flow are obtained. The curved surface of the imaginary annular member enhances the flow through the valve, i,e. The drag is small.

Another advantage lies with the self-centering of the valve plate in the valve seat, since the forces in the lower portion of the valve plate are always strong enough to overcome the counteracting friction forces in the upper portion of the seat surface and to thereby cause the valve plate into an optimum position.

Summarizing, it is to be noted that a much better sealing is obtained with a bulbous, spherical, convex valve seat surface, in particular a partial surface of a torus, than with a stroke valve having a conical valve seat surface. Further, it is possible to design a housing passage with enhanced flow properties having an approximately constant circular passage section.

Thus, the invention refers to a valve with a valve housing having an in-flow valve inlet and an out-flow valve outlet. The valve housing is provided with a valve seat and a blocking element arranged at the end of a spindle, the blocking element abutting positively and non-positively at a valve sealing surface of the valve seat, when in the closed position. The valve seat has a three-dimensional convex seat surface as the valve sealing surface. In other words, the valve sealing surface lies on the surface of an imaginary member (annular member) with a central axis and extending annularly about the valve seat. This is inclined under an acute angle α (angle of inclination of the annular member) to the main flow direction between the valve inlet and the valve outlet. The surface of the annular member suitably is a torus.

In an advantageous embodiment of the invention, the spindle is displaced vertically along the spindle axis, i.e. rectangular to the main flow direction along a pipe axis, wherein, in the closed position of the valve, the blocking element has at least a linear contact with the valve sealing surface of the valve seat and abuts a generating line around an inner convex surface of the annular member with at least one sealing line, a first generating line point close to the spindle and a second generating line point distant from the spindle being situated on the generating line. The first generating line point lies on a portion of a first circumference of a first cross-sectional area of the annular body, the portion extending between a first intersection and a first tangential point, the first intersection being a spindle-side intersection of a first diameter of the first cross-sectional area, extending in the effective direction of a pressure force $F_p$, with the first circumference, and the first tangential point being a first contact point of a first tangent to the inner convex surface, the tangent line extending in parallel with the spindle axis. The second generating line point lies on a portion of a second circumference of a second cross-sectional area of the annular member, the portion connecting a second intersection and a second tangential point, the second intersection being an intersection, inside the convex surface, of a second diameter of the lower cross-sectional area lying in the central plane with the second circumference, and the second tangential point being a contact point of a second tangent line to the inner convex surface extending in parallel with the spindle axis, the pressure force $F_p$ attacking in the direction of the normal at an inflow-side front of the blocking element and being caused by a pressure difference Δp between the valve inlet (11) and the valve outlet (12).

Preferably, the blocking element is a cone or a truncated cone with the blocking element having a convex outer shape in particular on the closing side.

As an alternative, the blocking element is formed on the closing side by a disc-like valve plate with a concave plate edge face as the valve plate sealing surface, the sealing line being a sealing edge of the valve plate sealing surface located on the inflow side, the valve plate sealing surface defining an inflow-side valve plate side (valve plate front side) so that the valve plate front side is inclined under an acute angle β (plate inclination angle) to a plane of rotation of the annular member, the plane standing rectangularly on the axis of rotation. Advantageously, it is provided that the sealing line and/or the sealing edge abut the generating line extending around a convex inner surface of the annular member, the line extending between the first generating line point close to the spindle and the second generating line point distant from the spindle, where the first generating line point is the first tangential point und the second generating line point is the second tangential point.

Preferably, the spindle axis is shifted from the center, and, preferably, it is shifted towards the first generating line point.

It is another aspect of the invention to provide a method for manufacturing a fitting, in particular for a slanted seat valve having, in particular, a toroidal seat surface, by which method the fitting housing may be fabricated in short manufacturing periods (cycle times) with a complex geometry, at low cost and in simple manner, and which allows for a high reproduction rate within a narrow tolerance range.

Until now, fittings and valves have been made using a combination of forming or reforming and machining methods so that the valve seat must be formed later. These conventional manufacturing methods are time consuming and costly, which is due, among other reasons, to the high number of process steps and, in particular, to the ulterior machining of the valve seat contour.

The present valve may be made in a simple manner by manufacturing a pipe with a predetermined diameter, which serves as the blank, into a fitting housing by a non-cutting forming process, the housing being a finished part with a spatially convex fitting seat surface as one fitting sealing surface.

The preferred method of production is high-pressure forming method (HPF), wherein the fitting housing is given its final shape in a plurality of method steps. Using the present method, one may also produce valve housings with a slanted valve seat having a three-dimensionally convex valve seat surface.

The inner diameter of a blank pipe corresponds to the nominal width of the fitting. The high-pressure forming method can work blanks with a wall thickness s between 1.0 and 10.0 mm, while pipes with wall thicknesses up to 25.0 mm may be used if the pipes are made of aluminum.

It is another advantage of this method that the pipe of the valve has almost the original wall thickness of the blank even in the formed area and that the wall thickness may be variably adjusted in the region of the seat depending on the predetermined elasticity of the seat.

With a variable process control of the high-pressure forming (HPF), the wall thickness can be varied so that the valve seat surface may be designed as an annular spring in the region of the valve seat surface, whereby manufacturing and operation tolerances are compensated elastically.

In high-pressure forming, a dimensional stability of the parts is provided only at the forming side of the tool, i.e. the non-pressurized side of the part surface. The dimensional stability of the valve seat is influenced substantially by the effective forming pressure $p_i$ or $p_a$ and the diameter ratio of the outer diameter of the die to the inner diameter of the pipe, the ratio being larger than 1. The tolerances for the surface facing the tool, i.e. the non-pressurized side of the finished part, are very small in high-pressure forming (HPF). Moreover, a very precise reproducibility within a narrow tolerance range are obtained.

Further, high-pressure forming (HPF) allows to form finished housings from any deformable (ductile) material.

It is another advantage that the high strain caused by deformation causes a workhardening in the area of the valve seat, the greater strength protecting the valve seat against wear.

Since, according to the preferred method for manufacturing the present valve, the sealing surface requires no posterior treatment and possible connections may be formed directly to the housing, valve housings can be made in very short production cycles, with optimum use of the material and minimum cutting (production of the valve plate). The production cycle for manufacturing a fitting housing is less than 3 minutes in a three-step HPF method. Using high-pressure forming (HPF) allows for very smooth surfaces by leveling the irregularities (peaks), resulting in a positive effect on the efficiency of the open fitting, because of the decreased drag.

With a valve having a blocking element with a concave sealing surface, the shape of the valve plate and possibly the valve seat is formed with a CNC milling machine and a form milling machine. A fine treatment may also be performed, if necessary.

The spindle is positioned when the blocking element is set into the valve seat, i.e. in the potential closed position of the valve. To do this, a bore (receiving opening) for positionally fixing the spindle at the blocking member is drilled only when the latter is in position, or the spindle is positioned into and adjusted in an existing bore of the blocking element.

The above described method for forming a fitting with a fitting housing and a blocking element arranged therein is characterized in that a pipe member serving as a blank and having a predetermined pipe inner diameter $d_{R,i}$ is worked by non-cutting forming into a fitting housing forming the finished part and having a spatially convex fitting seat surface as a fitting sealing surface. Here, the fitting housing is given its finished part shape preferably in a plurality of steps by a high-pressure forming process.

In an advantageous development, the method provides, when forming the blank into the finished part, the wall thickness of the blank is preserved, the fitting housing having approximately the original wall thickness of the blank even in the formed portion and the wall thickness being variably adjustable in the seat area depending on the predetermined elasticity of the seat.

The deforming of the blank preferably brings about a resilient fitting seat surface, in particular in the form of an annular spring.

The fitting manufactured according to the above described method is a stroke valve with a valve housing and a slanted valve seat. Advantageously, in a first method step for roughly forming the outer contour of the valve housing, the blank situated in a single- or multi-part tool form is widened into a T-shaped member with a passage portion and a branch (T-portion) closed at the end, wherein, after the closing of the tool form, the blank is compressed by the forming forces generated at the end faces of the blanks by pressing dies, and an internal pressure $p_i$ simultaneously presses the blank into an opening provided in the tool for forming the T-portion. Subsequently, the valve housing is given its finished part contour in a second method step, by penetrating the T-shaped member transversely to the longitudinal direction of the passage in the region of the branch, using a tool die, and cutting the closed end (cover) off the branch of the T-shaped member, and in a third method step for forming the interior in the region of the penetration, a valve seat contour is formed before the branch by an external high pressure $P_a$ applied to the outside of the T-shaped member using inner contour forming dies that are inserted as internal tools into the branch of the penetrated T-shaped member and into open end portions of the passage portion.

Advantageously, in shaping the inner contour, a valve seat is formed using the inner contour forming dies in the region of the penetration and in the longitudinal direction before the branch of the penetrated T-shaped member, the valve sealing surface lies on the surface of an imaginary annular member extending around the valve seat and obliquely to the branch.

Suitably, the blank has wall thickness between 1 and 10 mm; preferably, the diameter ratio of the die outer diameter $d_{s,a}$ of the inner contour forming die and the pipe inner diameter $d_{R,i}$ of the blank is larger than one.

BRIEF DESCRIPION OF THE DRAWINGS

The following is a detailed description of preferred embodiments of the invention with reference to the drawings. In the Figures.

DETAILED DESCRIPTION OF THE INVENTION

The embodiments of a slanted seat valve 1, illustrated in FIGS. 1 to 5, comprise a valve housing 2 with a valve seat 5, an inflow-side valve inlet 11 and an outflow-side valve outlet 12 that may be blocked against the flowing medium by a blocking element 3 fixed at the end of a spindle 4 disposed in the housing 2. In the embodiments illustrated, the spindle 4 is displaced along its spindle axis SA rectangularly to the flow direction SR or the pipe axis. In the closed position of the valve 1, the blocking element 3 abuts a bulbous, spherical or convex bulging valve sealing surface 50 of the valve seat 5, which lies on an imaginary annular member RK extending around the valve seat 5 and having a torus 6 as the surface.

The positions given for the points MP1, MP2, SP1, SP2, TP1, TP2, and the sections U1, U2, QF1, QF2 on the torus 6 refer to an imaginary coordinate system with its origin in the center of the torus 6 and the axes of which lie on the central axis RA and the plane of rotation or central plane RE of the annular member RK, where "top" and "bottom" describe the position of a valve 1 with an upward spindle extension as illustrated in FIGS. 1, 2a and 2b, 4 and 5.

The torus 6 is inclined under an acute angle α (annular member inclination angle) in the direction of the main flow direction SR extending between the valve inlet 11 and the valve outlet 12.

The annular member inclination angle α enclosed by the main flow direction SR and the central plane RE of the torus 6 has a value of 0° to 90°, in particular 30° to 60° and preferably 40° to 50° so that the sectional area of flow has a circular or elliptic shape in the closing region of the blocking element 3.

The blocking element 3 may be a valve plate 31 with a concave plate edge surface as the generated surface 30 (see FIG. 2a) or a truncated cone 3a (see FIG. 2b) or, generally, an element with a concave generated surface. The contour of the blocking element 3 is designed such that, in the closed position, its generated surface 30 abuts a generating line 63 along at least one sealing line 33, the generating line extending along the inner generated surface 61 of the annular member 6, on which generated line a first (top) tangential point TP1 close to the spindle is provided as a first generating line point MP1 and a second (bottom) tangential point TP2 distant from the spindle is provided as a second generating line point MP2.

In the closed position of the valve 1, a component of the pressure force $F_p$, extending in the direction of the normal to an inflow-side front face of the blocking element 32, attacks at the blocking element 31, this pressure force $F_p$ resulting from the pressure difference Δp between the front face 32 or the valve inlet 11 and the outflow-side rear face 36 of the blocking element or the valve outlet 12.

Figure 1:
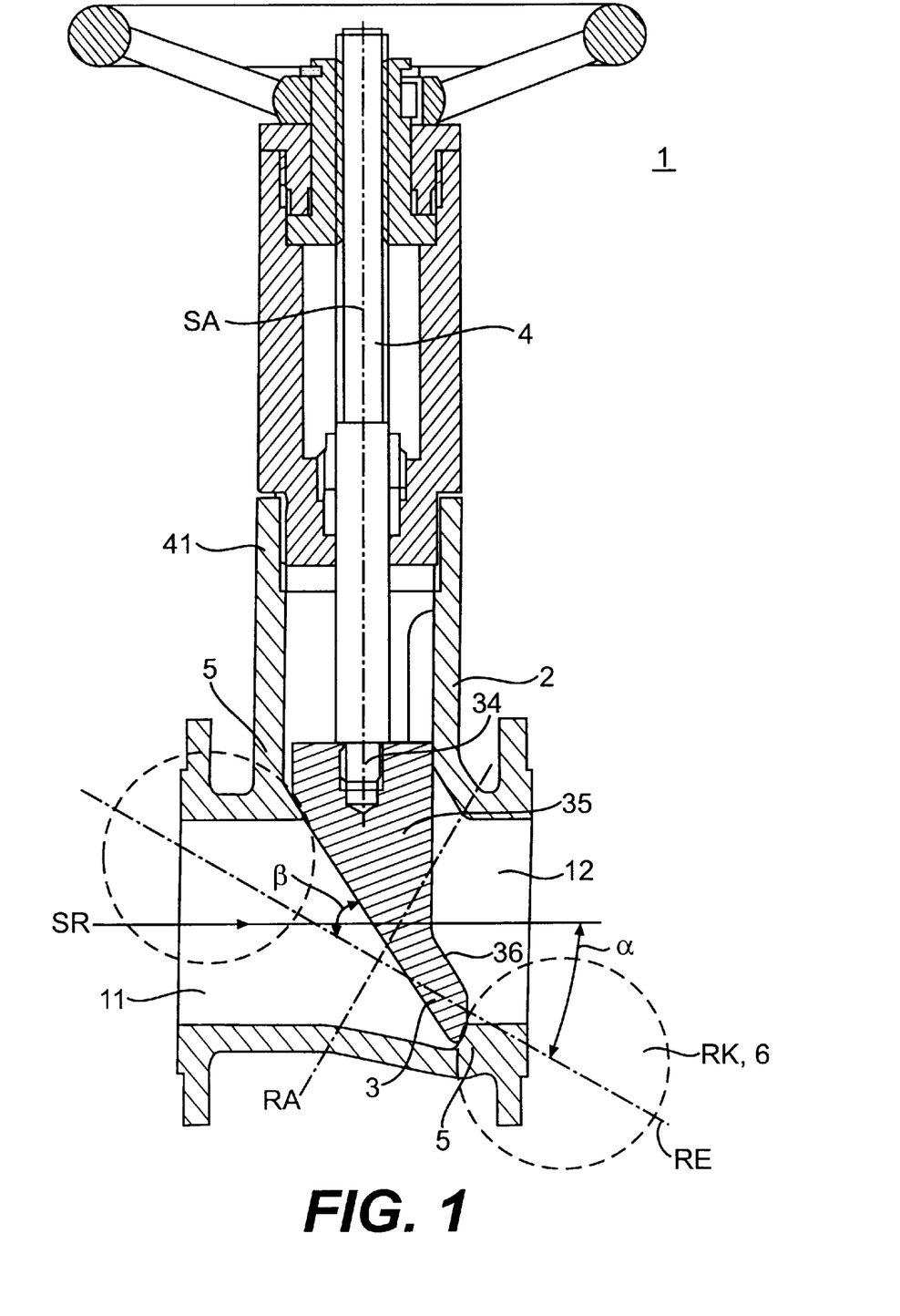
FIG. 1 is a sectional view of a slanted seat valve with a toroidal valve seat and a valve plate in vertical section.

FIG. 1 illustrates a slanted seat valve 1 with a valve seat 5, in which the valve inlet 11 and the valve outlet 12 lie on an axis extending in the flow direction SR, the clear passage of which corresponds to the nominal width in the closing region of the blocking element 3. The valve seat 5 comprises a valve sealing surface 50 that corresponds to a part of the toroidal surface.

The rear face 36 of the blocking element is adapted to the valve housing 2 so that the rear face 36 abuts positively on the inner wall of the housing, when the valve 1 is open.

The blocking element 3 is reinforced in the region of the receiving opening 34 for the spindle 4, i.e. the shape passes from a disk-like plate form into a compact block 35 including the receiving opening 34.

Figure 2A:
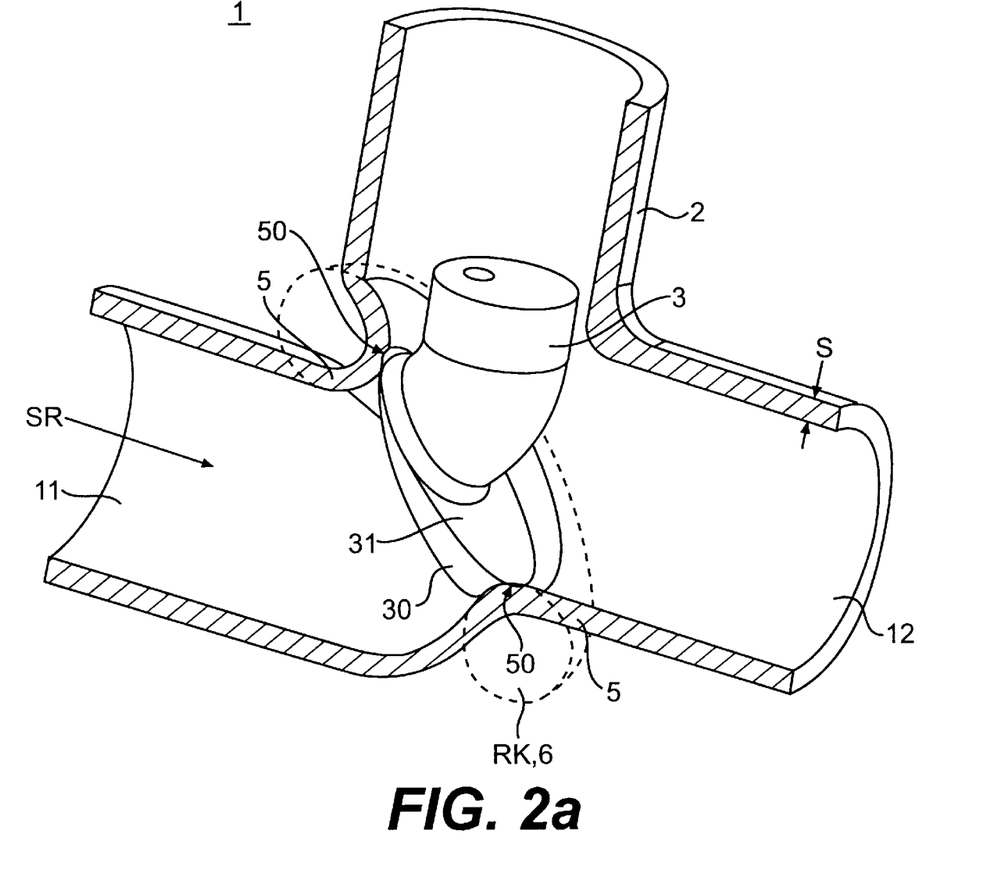
FIG. 2a is a perspective view of another embodiment of a slanted seat valve with a toroidal valve seat and a valve plate in vertical section.

FIG. 2a illustrates an embodiment of a slanted seat valve 1 with a toroidal valve seat 5, in which the open diameter is reduced in the closing region of the blocking element 3, the valve inlet 11 and the valve outlet 12 being disposed coaxially with respect to each other.

Figure 3:
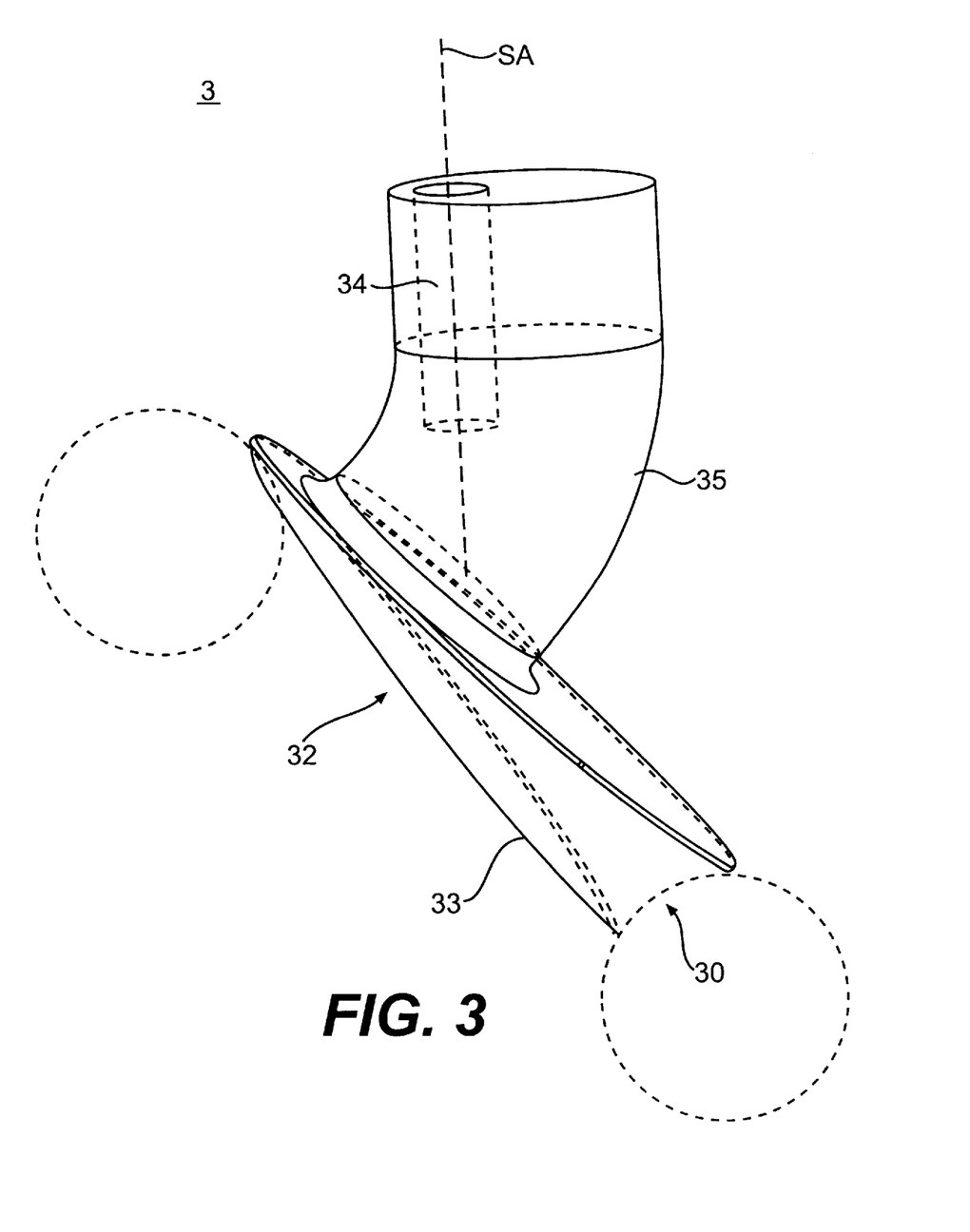
FIG. 3 is a side elevational view of the blocking element in FIG. 2.

On the closing side, the blocking element 3 (see FIG. 3) is formed by a disk- and wedge-shaped valve plate, the concave plate edge surface forming the valve plate sealing surface (see surface 30 in FIG. 3). In the closed state, the valve plate with its circumferentially extending sealing surface almost linearly abuts the top portion of the valve seat 5 that is close to the spindle and presents a surface abutment at the bottom portion of the valve seat 5 distant from the spindle.

At the side of the spindle, the blocking element 3 has a reinforcement 35 in the form of an arcuate extension member 35 forming a shaft for receiving the spindle 4.

Figure 2B:
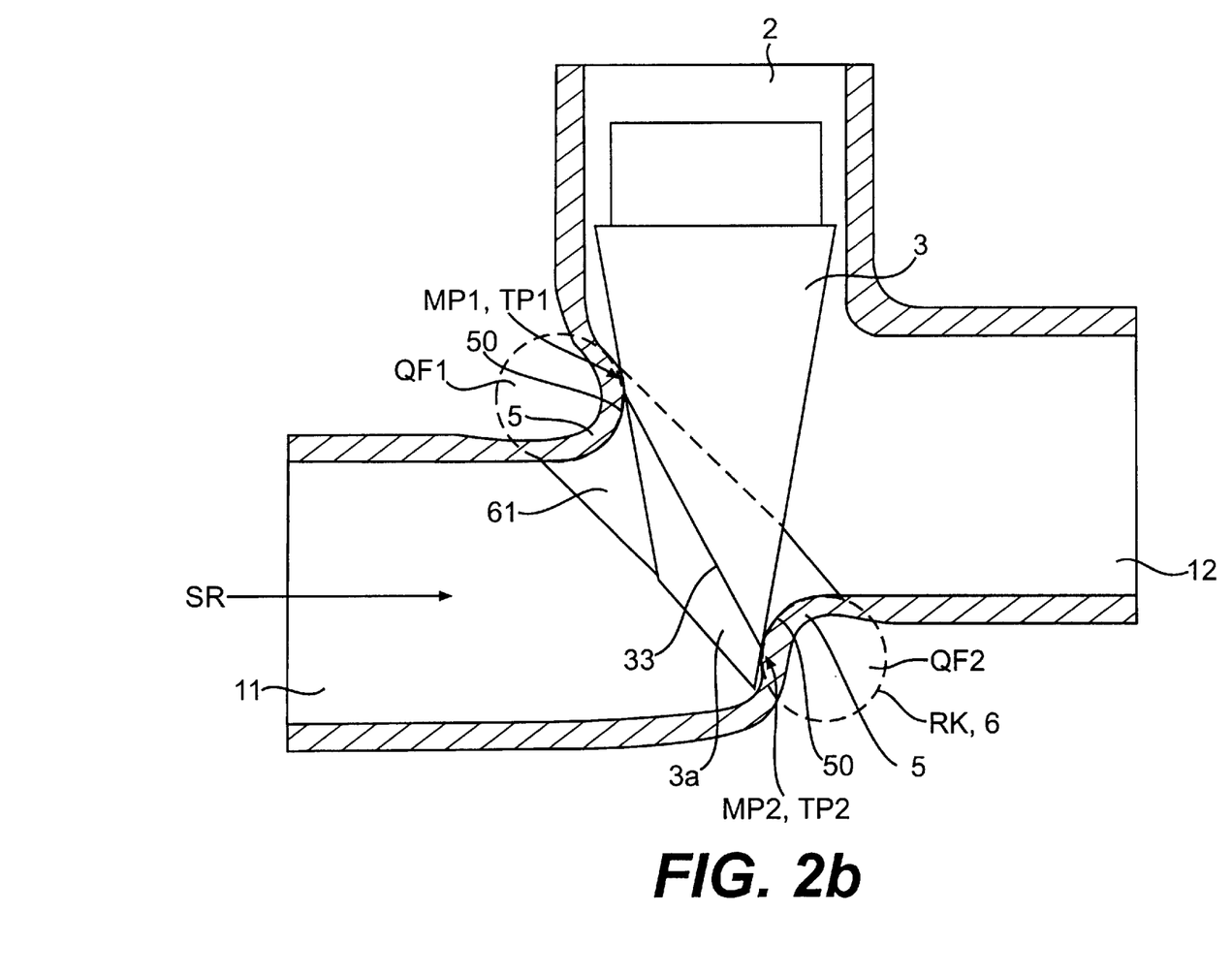
FIG. 2b is a side elevational view of a slanted seat valve with a toroidal valve seat and a conical blocking element in section.

FIG. 2b also illustrates an embodiment of a slanted seat valve 1 comprising a valve seat 5 corresponding to a part of a torus surface, as shown in FIG. 2a, yet, the blocking element 3 is formed by a truncated cone 3a at the closing side. In the closed position, the blocking element 3, 3a extends into the torus 6 and seals the valve 1 against the flowing medium along the sealing line 33 which is identical with the generating line 63 of the torus 6 forming the contact line 63.

Figure 4:
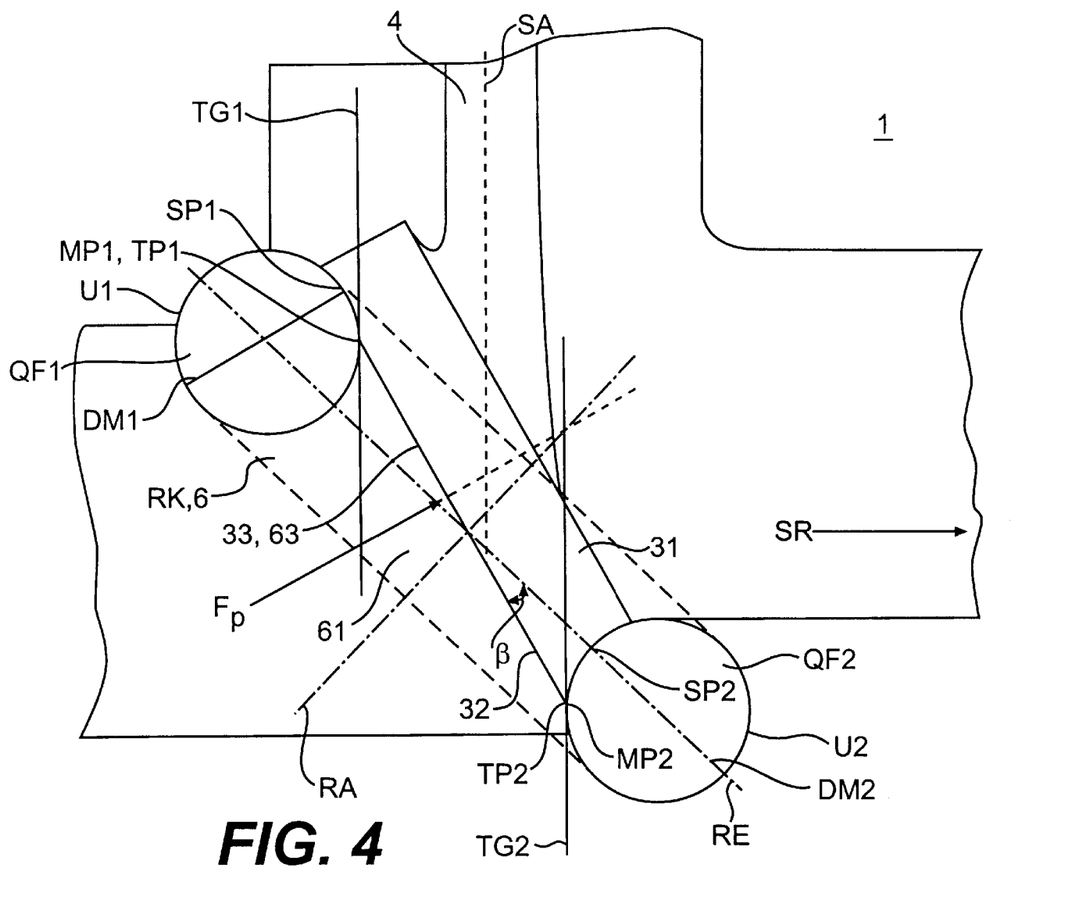
FIG. 4 is a schematic side elevational view of the stroke valve of FIG. 2 in vertical section.

FIG. 4 serves to explain the dependence of the contour of the valve plate 31 with a sealing surface 30 and the imaginary (toroidal) annular member RK, 6, extending annularly bout the valve seat 5 of the housing 2. The valve housing 2, having a wall thickness s with a constant value over the entire cross section, is produced using a manufacturing method for making fitting housings, the method steps thereof being illustrated in FIGS. 6a to 6c. The valve plate front face 32 is inclined under an acute angle β (plate inclination angle) to the central plane RE of the annular member RK, 6.

In the closed position of the valve, the valve plate 31 abuts a generating line 63 extending around a generated inner surface 61 of the torus 6 with a front sealing edge 33 of the valve plate sealing surface 30, a first top generating line point MP1 and a second bottom generating line point MP2 being situated on this generating line 63.

In a vertical section through the valve 1, the entire sectional area of the annular member RK, 6 is formed by two circular surfaces (sectional areas) QF1, QF2, the first sectional area QF1 being close to the spindle, that is above the centrals axis RA, and the second sectional area QF2 being distant from the central axis RA.

The first generating line point MP1 is located on a first circumferential portion U1 of the first top sectional area QF1 that extends between a first intersection SP1 and a first tangential point TP1. The first intersection SP1 is a spindle-side intersection SP1 of a first diameter DM1 of the top sectional area QF1, extending in the effective direction of the pressure force $F_p$, and the circumference U1 thereof.

The first tangential point TP1 is a contact point of a tangent line TG1 to the generated inner surface 61 of the upper torus portion in the first sectional area QF1, the tangent line extending in parallel with the spindle axis SA.

The second generating line point MP2 lies on a second circumferential portion U2 of the second, lower sectional area QF2, the portion connecting a second intersection SP2 and a second tangential point TP2.

The second intersection SP2 is an intersection SP2, located on the inside of the generating line, of a second diameter of the lower sectional area QF2 situated in the central plane RE and the circumference U2 thereof.

The second tangential point TP2 is a contact point of a tangent line TG2 to the generated inner surface 61 of the lower torus portion in the second sectional area QF2, the tangent line extending in parallel with the spindle axis SA.

The valve plate 31 undercuts the valve seat 5 in the lower portion in the effective direction of the pressure force $F_p$. In the upper portion of the valve seat 5, however, the valve plate 31 rests on the top face of the seat surface 50.

Figure 5:
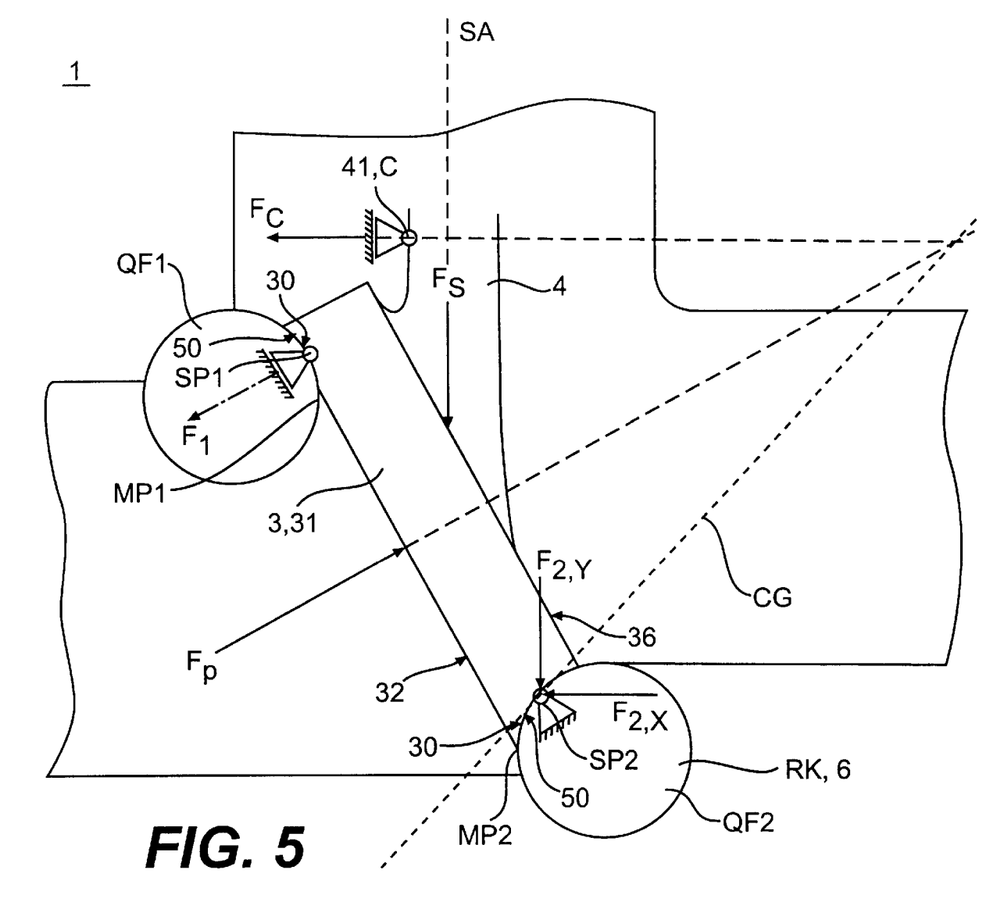
FIG. 5 is a schematic side elevational view of the stroke valve of FIG. 2 in vertical section, with a diagram of the forces acting on the blocking element.

The diagram of forces illustrated in FIG. 5 illustrates the interaction of the forces ($F_p$, $F_s$) attacking at the valve seat 5 and the spindle 4 with the valve plate 31.

For a study of the force relations at the valve plate 31, the force behavior will be explained, for reasons of simplicity, with reference to a rigid bar, with frictional forces being neglected. The undercut of the valve seat 5 by the valve plate 31 in the direction of the pressure force $F_p$ causes the blocking element 3 to be supported in the second intersection SP2, presenting one bearing point, and to be supported at the spindle guide 41 as a further bearing point C; thus, the forces $F_{2,x}$, $F_{2,y}$ und $F_c$ are applied. The bearing force $F_c$ is a reaction force to the pressure force $F_p$, directed axially to the spindle axis SA.

Since the pressure force $F_p$ and the spindle axis SA are arranged under an acute angle to each other, the valve 5 is self-sealing, i.e., the blocking element is supported in a stable manner in the axial direction at the second intersection SP2 and the bearing point C without any effective spindle force $F_s$.

In the portion of the sealing surface 30, 50, distant from the spindle and below the spindle axis SA, the pressure force $F_p$ attacking at the blocking element 3 is in balance with the force components $F_{2,x}$ and $F_{2,y}$ in the second bearing point SP2 and with the bearing force $F_c$ acting rectangularly on the spindle axis SA.

Since the valve plate 31 is supported in the lower portion of the valve seat 5 at the bearing point SP2 and at the spindle guide 41 at a right angle to the spindle axis SA, the portion of the blocking element 3 that is close to the spindle, is not pushed off the valve seat 5 by the pressure force $F_p$ in the portion above the spindle axis SA.

An effective spindle force would be distributed evenly over the intersections SP1, SP2, without, upon an increase in pressure, an additional pressure force $F_p$ having any influence on the sealing between the valve seat sealing surface 50 and the valve plate sealing surface 30 or the surface pressure resulting therefrom.

The present arrangement of the valve plate 31 allows for a self-centering of the plate 31, since the bearing forces $F_{2,x}$ and $F_{2,y}$ in the lower portion of the valve plate are sufficiently strong to overcome the opposing frictional forces and to push the plate into an optimum position. The self-centering is enhanced by a larger torus diameter, since in this case the valve seat sealing surface 50 forms a more acute angle with the spindle axis SA in the upper torus section QF1.

Figure 6A:
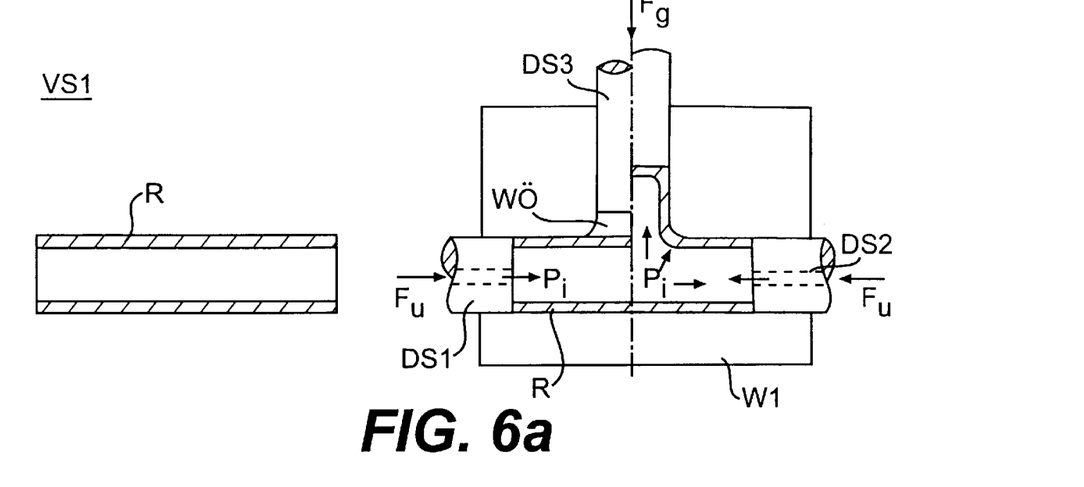
FIG. 6a illustrates a first method step of a HPF process, wherein a blank is widened into a T-shaped member.
Figure 6B:
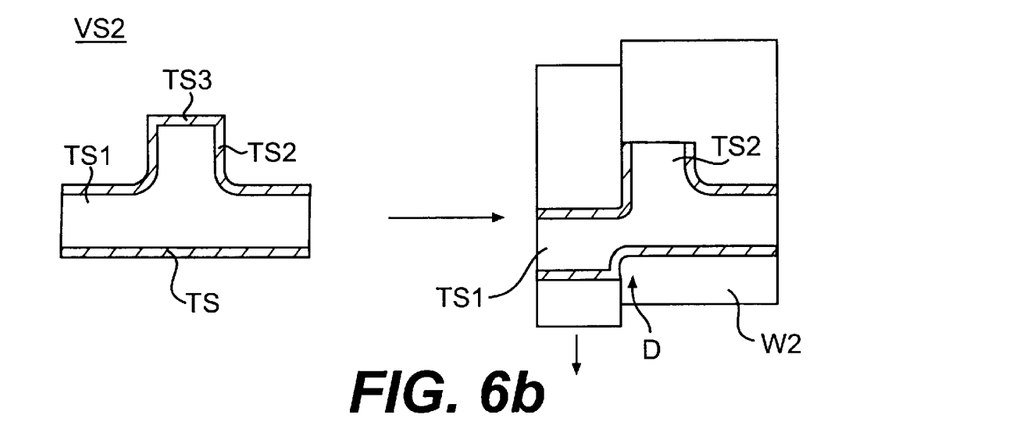
FIG. 6b illustrates a second method step of the HPF process, wherein the T-shaped member is penetrated and the closed end of the T-shaped member is cut off.
Figure 6C:
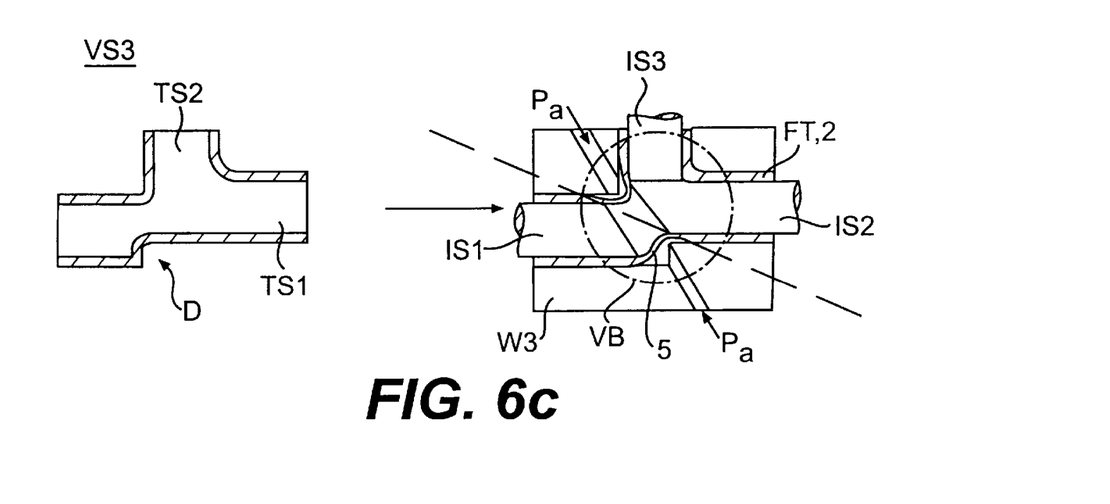
FIG. 6c illustrates a third method step of the HPF method, wherein the penetrated T-shaped member is provided with the valve contour.

FIGS. 6a to 6c illustrate the method steps VS1, VS2, VS3 of a three-step manufacturing method for producing a slanted seat valve 1 with a (toroidal) valve seat surface as of FIG. 4.

When manufacturing a valve housing 2 according to the high-pressure forming method (HPF), it is provided in a first method step VS1 (see FIG. 6a) for obtaining a rough outer contour of the valve housing 2, a blank R is widened into a T-shaped member TS with a passage portion TS1 and a branch TS2 closed at the end. First, the blank R is placed into a tool form W1 with one or a plurality of parts and presenting the outer shape of the T-shaped member TS, and after closing the tool form W1, the blank is subsequently compressed by the forming forces $F_u$ generated at the end faces of the blank R by pressing dies DS1, DS2. Using elongating and drawing processes and an externally generated internal pressure $p_i$ applied to the blank R, the pipe material is pressed into an opening WÖ formed in the tool for forming the transverse T-portion TS1, thereby obtaining the desired shape. A pressing die DS3 in the tool opening WÖ is a pressure pad DS1 acted upon by the force $F_G$ and supporting a uniform shaping of the branch TS2.

Preferably, longitudinally welded pipes are used as the blanks R.

To generate a sufficiently high internal pressure $p_i$, the blank is preferably filled with a non-compressible medium.

In a second method step VS2, the T-shaped member (TS) is penetrated transversely to the longitudinal direction of the passage portion TS1 in the area of the branch TS2 using a tool die WS2. The region of the penetration D forms the basic form of the slanted valve seat 5. The closed end (cover) of the branch TS2 is cut off.

In a third method step VS3, using high-pressure forming, the contour of the valve seat 5 is shaped by the internally located tool IS1, IS2, IS3 by applying an external high pressure $p_a$ to the outside of the T-shaped member TS. To this avail, a three part tool IS1, IS2, IS3 is inserted into the branch TS2 and the open ended portions of the passage portion TS2. The pressure $p_a$ on the exterior of the workpiece TS is generated by compressing an incompressible medium, the force being applied by dies arranged in pressure lines of the tool W3.

The following is a detailed description of further embodiments of the invention made with reference to FIGS. 7 to 13. It is to be noted that the previously stated considerations concerning the force ratios an the relative arrangement of the individual components of the valve should also be applied to the embodiments mentioned below.

FIGS. 7 to 10 are longitudinal sections of two embodiments 60, 60', both valves having the same valve housing 62. While the valve 60 is a straight-way valve, the valve 60' is designed as a corner valve.

Figure 7:
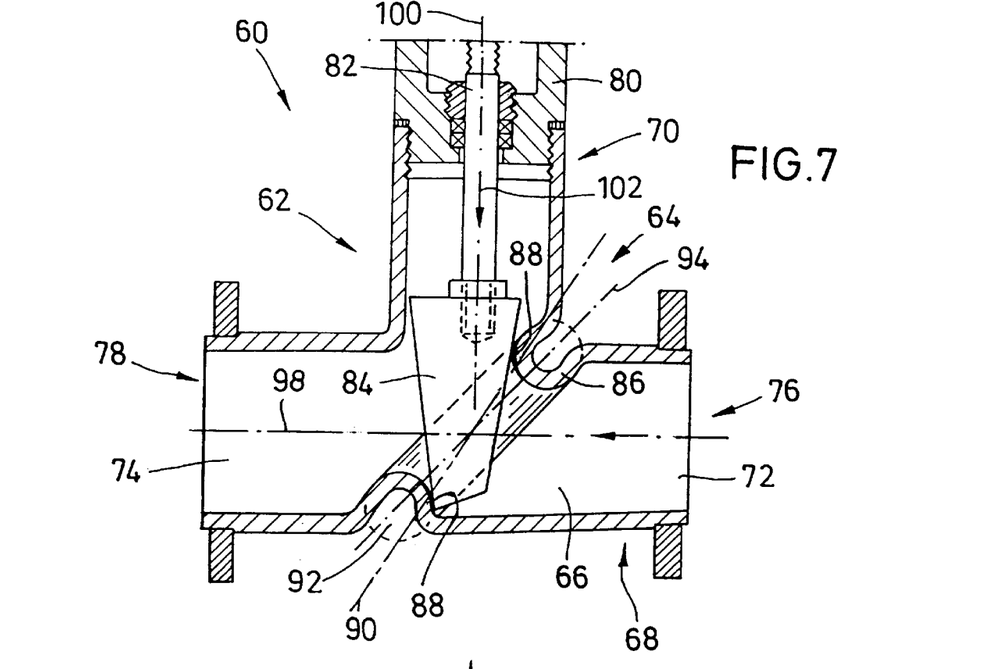
FIGS. 7 and 8 illustrate another embodiment of the invention in the form of a straight-way valve in the closed position (FIG. 7) and in the open position (FIG. 8)
Figure 8:
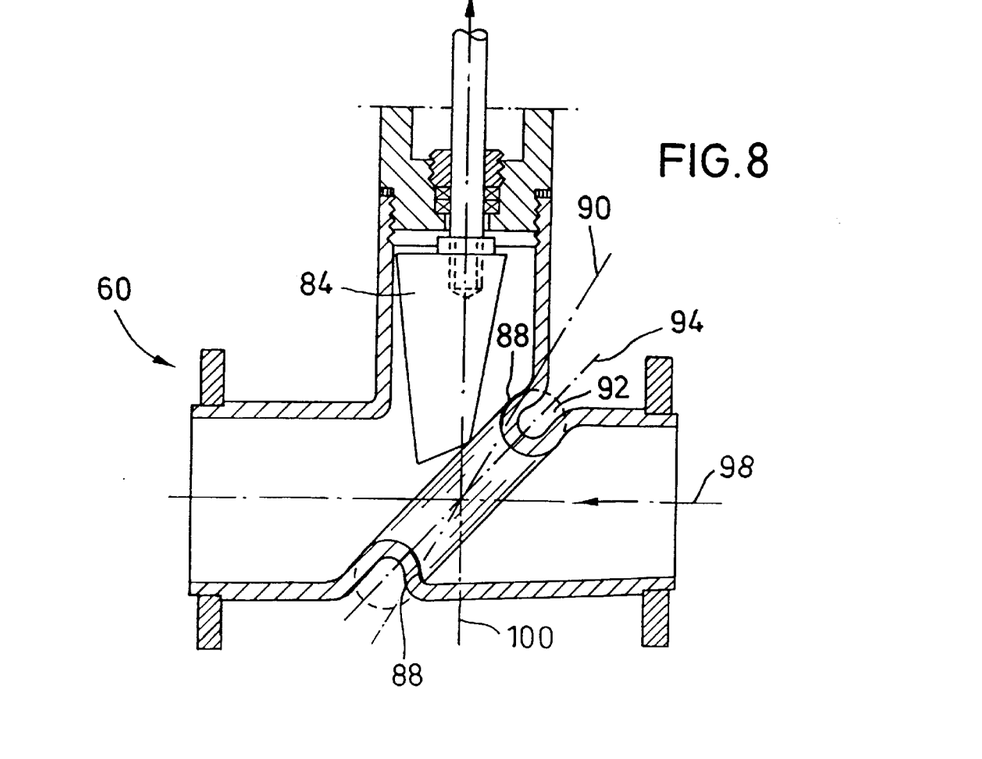

The valve housing 62 of the valve 60, illustrated in FIG. 7 in the closed position and in the open position in FIG. 8, comprises a T-shaped pipe member 64 consisting of a passage pipe portion 68 forming the passage 66 and a branch pipe portion 70. The valve housing 62 is made of plastics material. The opposite axial ends 72, 74 of the passage pipe portion 68 form the inlet 76 and the outlet 78, respectively, of the valve 60. The branch pipe portion 70 is joined by a mounting means 80 for a movement element in the form of a spindle 82 having one end provided with a blocking element 84 in the form of a beveled truncated cone. Turning the spindle 82 (the associated turning means is not illustrated in the FIGS. 7 to 10) moves the blocking member 84 rectangularly into the passage 66.

In the passage 66, a valve seat 86 is formed that has a valve seat surface 88. The valve seat surface 88 encloses a surface arranged in a plane 90 extending under an acute angle to the passage 66. The valve seat surface 88 is part of the surface of an imaginary annular member 92, the central plane 94 of which extends under an acute angle to the plane 90. The central axis 96 of the annular member 92 extends perpendicularly to the central plane 94. The annular member 92 forms an angle of about 45° with the longitudinal axis 98 of the passage 66. This longitudinal axis 98 intersects the intersection of the central plane 94 with the central axis 96. The longitudinal axis 100 of the branch pipe portion 70 also passes through this intersection.

As illustrated in FIG. 7, the valve seat 86 is formed by a bead-like deformation of the wall of the passage pipe portion 68. This bead-like deformation causes an inward directed projection in the passage 66, the surface of which corresponds to the inner surface of the ring. The annular member 92 itself is of an oval shape. The main axes of this oval are dimensioned relative to each other such that, seen in the direction of movement 102 of the blocking element 84, a circular inner surface is obtained into which the frustoconical blocking member 84 plunges to block the passage 66.

In the blocking position of FIG. 7, the outer surface of the blocking element 84 abuts the valve sealing surface 88 of the valve seat 86. Here, undercutting between the blocking member 84 and the valve seat 86 occurs.

Figure 9:
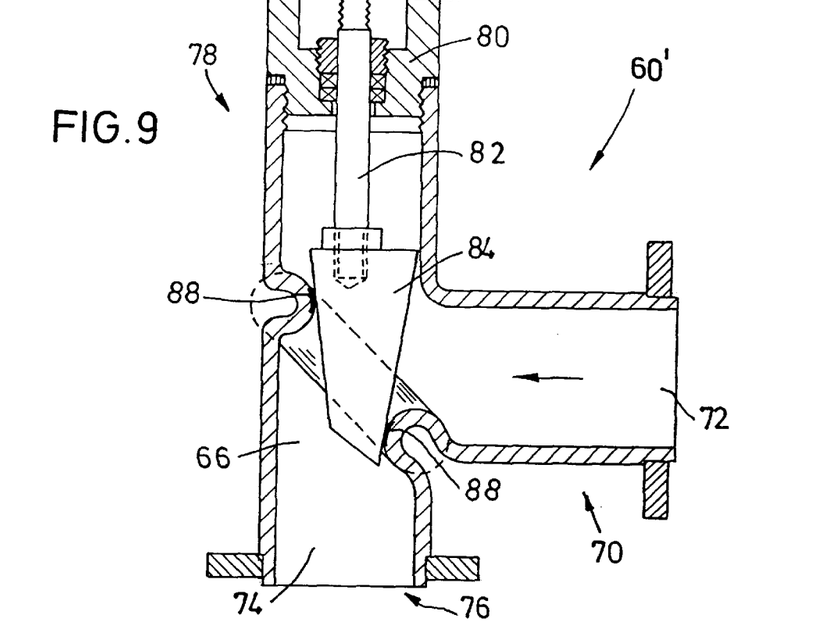
FIGS. 9 and 10 illustrate an embodiment of the invention in the form of a corner valve in the closed position (FIG. 9) and in the open position (FIG. 10), the valve housing being identical to the valve housing of the valve in FIGS. 7 and 8, and FIGS. 11 to 13 are partial longitudinal sections of further embodiments of the present valve for illustrating different possible designs of the valve sealing surface.
Figure 10:
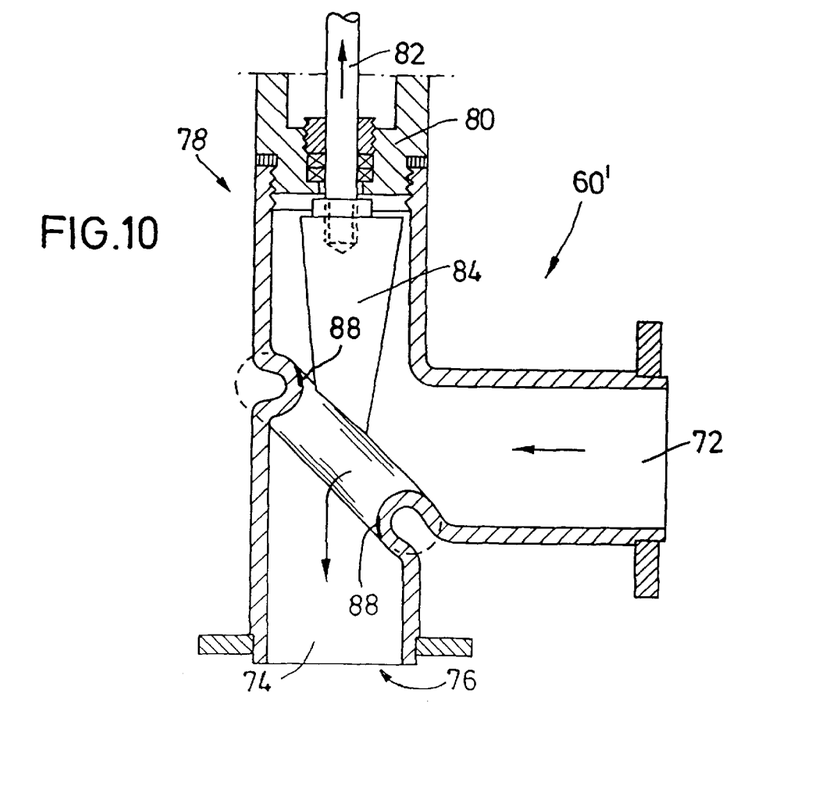

The advantage of the design of the valve housing 62 as illustrated in FIGS. 7 and 8 is that this valve housing 62 may be used both for the straight-way valve 60 of FIGS. 7 and 8 and for the corner valve 60' of FIGS. 9 and 10. The two variants use different surface portions of the valve seat 86 for the sealing between the housing 62 and the blocking member 84. In as far as the parts of the corner valve 60' correspond to those of the straight-way valve 60 of FIGS. 7 and 8, they have been accorded the same reference numerals in FIGS. 9 and 10.

Figure 11:
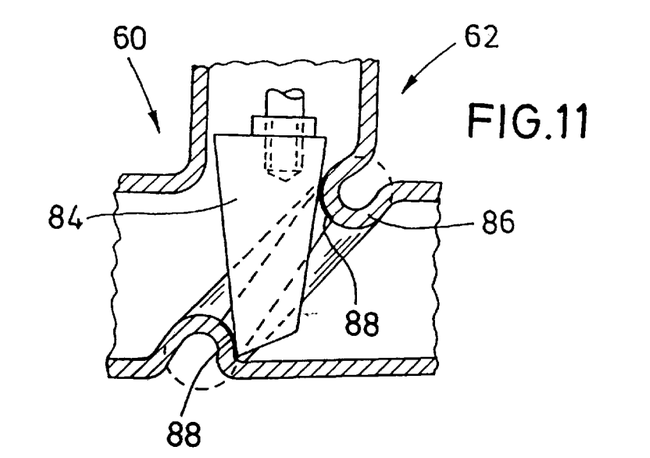
Figure 12:
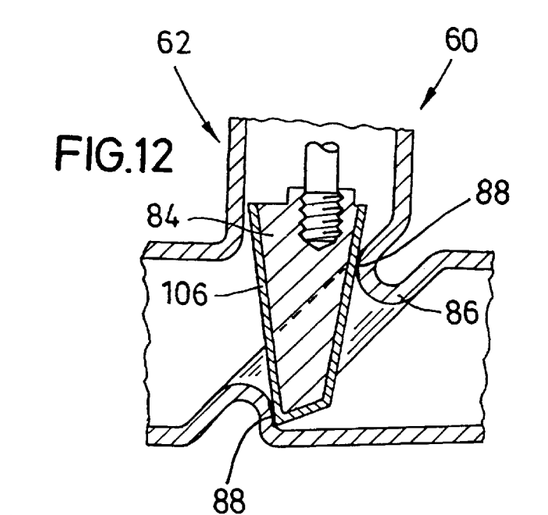
Figure 13:
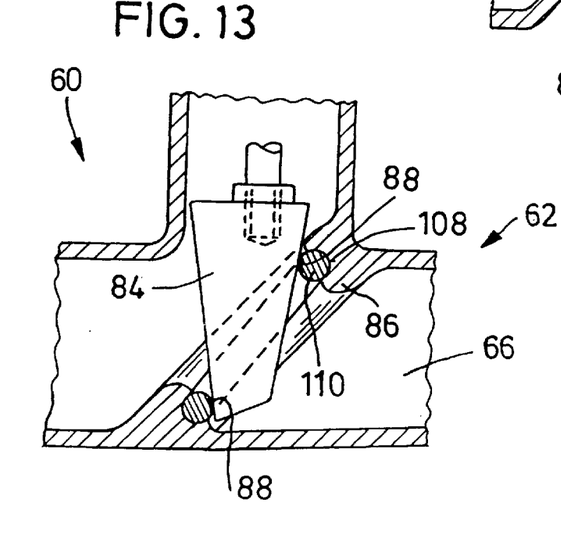

FIGS. 11 to 13 illustrate different embodiments of the design of the sealing surfaces between the valve seat and the blocking element. Also in these Figures, the parts corresponding to those of the valves 60 and 60' of the FIGS. 7 to 10 are identified by the same reference numerals in FIGS. 11 to 13.

As illustrated in FIG. 11, the sealing of the valve 60 is effected by making the valve housing 62 of plastics material. For manufacturing reasons (manufacturing the valve housing 62 as an injection molded member or by high-pressure forming, for example), a valve sealing surface 88 is formed at the valve seat 86, the quality of the valve sealing surface being sufficient to directly cooperate with the outside of the blocking element 84 so as to seal the valve 60. Instead of plastics material, other material such as metal, for example, may be used.

In the embodiment of FIG. 12, the blocking element 84 is provided with a material coating 106 cooperating with the valve sealing surface 88 of the valve seat 86 to seal the valve 60. This material coating 106 may be elastically deformable. The housing 62 of the valve 60 of FIG. 12 is made from metal or plastics material.

In the embodiment of FIG. 13, the housing 62 of the valve 60 is made of metal. The inner projection of the passage 66 forming the valve seat 86 is provided with a receiving groove 108 inclined at about 45°, an oval sealing member 110 of elastic plastics material being inserted therein. This oval annular member 110 provides for sealing together with the blocking element 84. Again, a sealing surface 88 forms on this annular member 110, the sealing surface taking only a part of the surface of the annular member 110 and, as in the other embodiments of the valves according to FIGS. 7 to 12, substantially linearly contacting the blocking element 84 and thereby sealing the valve 60.

What is claimed is:

1. A valve comprising
   a valve housing with a valve inlet, a valve outlet and a passage extending through the valve housing from the valve inlet to the valve outlet,
   a valve seat provided in the passage and comprising a valve sealing surface, and
   a blocking element adapted to be moved at least partly into the valve seat for blocking the passage by abutment on the valve sealing surface, the blocking element being moved along a direction extending under an acute angle to the plane in which the valve seat is arranged,
   wherein
      the valve sealing surface of the valve seat is bulbous in shape and forms a part of the surface of an imaginary annular member,
      the annular member has a bottom face facing the valve inlet and a top face facing the valve outlet, and the valve sealing surface is formed by parts of the surface of the imaginary annular member located in part on the top face and the bottom face, respectively, and, again in part, on the inner surface of the imaginary annular member between the top and the bottom faces thereof, the plane in which the valve seat is arranged, extends under an acute angle to the plane in which the annular member is located, and the blocking element passes through the valve seat plane and the annular member plane when in abutment on the valve seat surface.

2. The valve of claim 1, wherein the angle is between 10° and 30°, preferably about 20°.

3. The valve of claim 1, wherein the imaginary annular member is a circular, elliptic or oval annular member having a circular or otherwise round cross section.

4. The valve of claim 1, wherein the direction of movement of the blocking element is substantially rectangular to an extension of the passage.

5. The valve of claim 1, wherein the plane in which the valve seat is located extends under an acute angle of inclination of the valve seat to the extension of the passage.

6. The valve of claim 1, wherein the plane in which the annular member is located extends under an acute angle of inclination of the annular member to the extension of the passage.

7. The valve of claim 6, wherein the angle of inclination of the annular member is between 30° and 60°, in particular between 40° and 50°, and preferably substantially about 45°.

8. The valve of claim 1, wherein the blocking element is a pointed, blunt or beveled cone, and the imaginary annular member is an elliptic ring with a circular cross section, the imaginary annular member being inclined such with respect to the direction of movement of the blocking element that it encloses a circular area, seen in the direction of movement of the blocking element.

9. The valve of claim 1, wherein the valve seat is an integral part of the valve housing.

10. The valve of claim 1, wherein the valve housing is a T-pipe with a substantially straight passage pipe portion and a branch pipe portion substantially rectangular to the same, and that the passage pipe portion is provided with an inward protruding continuous annular surface section situated in a plane inclined under an angle of 45° to the longitudinal axis of both the passage pipe portion and the branch pipe portion and on which surface section the valve sealing surface lies, the spherical surface section extending along one of the two corner portions between the passage pipe portion and the branch pipe portion.

11. The valve of claim 10, wherein the spherical surface section is formed by locally deforming the T-pipe in a bead-like manner.

12. The valve of claim 1, characterized in that the valve housing is made of plastics material.

13. The valve of claim 1, characterized in that the valve housing is an injection molded part.

14. The valve of claim 1, characterized in that the valve housing is formed by a non-cutting forming of a pipe piece.

* * * * *